US007386237B1

(12) United States Patent
Compton

(10) Patent No.: US 7,386,237 B1
(45) Date of Patent: *Jun. 10, 2008

(54) WIRELESS OBJECT COUNTER

(75) Inventor: John I. Compton, Lexington, KY (US)

(73) Assignee: Point Six Wireless, LLC, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/703,990

(22) Filed: Feb. 8, 2007

Related U.S. Application Data

(63) Continuation of application No. 10/635,403, filed on Aug. 7, 2003, now Pat. No. 7,206,514.

(51) Int. Cl.
*H04B 10/00* (2006.01)

(52) U.S. Cl. .................. 398/106; 250/221; 250/338.1; 340/600; 340/693.3; 340/942; 377/6; 377/53

(58) Field of Classification Search ................ 398/151, 398/130–131, 106, 154; 250/221, 221.1, 250/224, 338.1, 341; 340/825.2, 933, 934, 340/10.1, 10.3, 10.6, 942–943, 825.65, 600; 377/6, 53

See application file for complete search history.

(56) References Cited

U.S. PATENT DOCUMENTS

| | | | | |
|---|---|---|---|---|
| 3,924,130 A | * | 12/1975 | Cohen et al. ................ 250/342 |
| 3,929,277 A | * | 12/1975 | Byrne et al. ................. 235/376 |
| 3,965,355 A | * | 6/1976 | Maccabee et al. ........ 250/341.1 |
| 4,070,560 A | * | 1/1978 | Blanyer .......................... 377/9 |
| 4,088,990 A | * | 5/1978 | Sass ............................ 368/223 |
| 4,207,466 A | * | 6/1980 | Drage et al. .............. 250/338.1 |
| 4,247,758 A | * | 1/1981 | Rodrian .......................... 377/6 |
| 4,441,196 A | * | 4/1984 | Sanville ......................... 377/9 |
| 5,128,548 A | * | 7/1992 | Goodson et al. ......... 250/341.1 |
| 5,640,143 A | * | 6/1997 | Myron et al. ................ 340/541 |
| 5,917,631 A | * | 6/1999 | Shafer ........................ 398/106 |

(Continued)

FOREIGN PATENT DOCUMENTS

SU    1193704    * 11/1985

OTHER PUBLICATIONS

U.S.D.A. Forest Service Equipment Development Center and Scientific Dimensions, Inc. (Albuquerque, N.M.) "Trail Traffic Counter" Installation Maintenance & Theory of Operation 1994.*

*Primary Examiner*—Leslie Pascal
(74) *Attorney, Agent, or Firm*—Frank C. Leach, Jr.

(57) ABSTRACT

A battery powered transmitter circuit has a LED of a continuously cycling microcomputer transmit a beam of a predetermined number of infrared pulses at predetermined time periods to a sensor of a battery powered receiver circuit. Only a clock circuit of each circuit of the same frequency is continuously powered. The two clock circuits are synchronized each time that the sensor senses the predetermined number of infrared pulses. When an object breaks the beam, the sensor causes a count of the object by a microcomputer of the receiver circuit. The receiver microcomputer is inactivated when the sensor does not sense the predetermined number of infrared pulses during one or more cycles of operation of the receiver microcomputer. There is only one count incremented on a count display after the beam is interrupted until the sensor again senses the predetermined number of infrared pulses.

22 Claims, 11 Drawing Sheets

U.S. PATENT DOCUMENTS 5,925,110 A * 7/1999 Klein ..................... 710/15
6,121,875 A * 9/2000 Hamm et al. ............. 340/540
6,255,962 B1 * 7/2001 Tanenhaus et al. ..... 340/870.05
6,542,079 B1 * 4/2003 Kahl, Sr. ................. 340/568.5

* cited by examiner

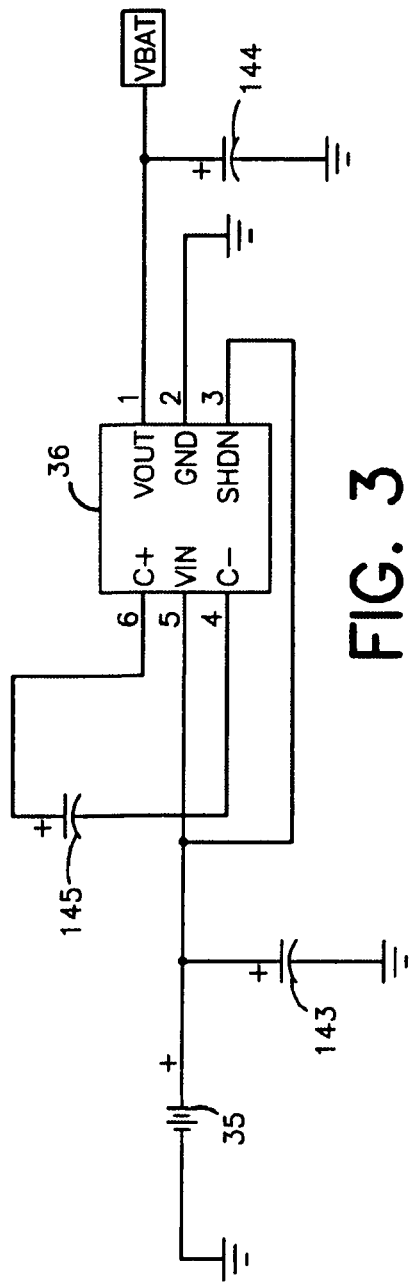
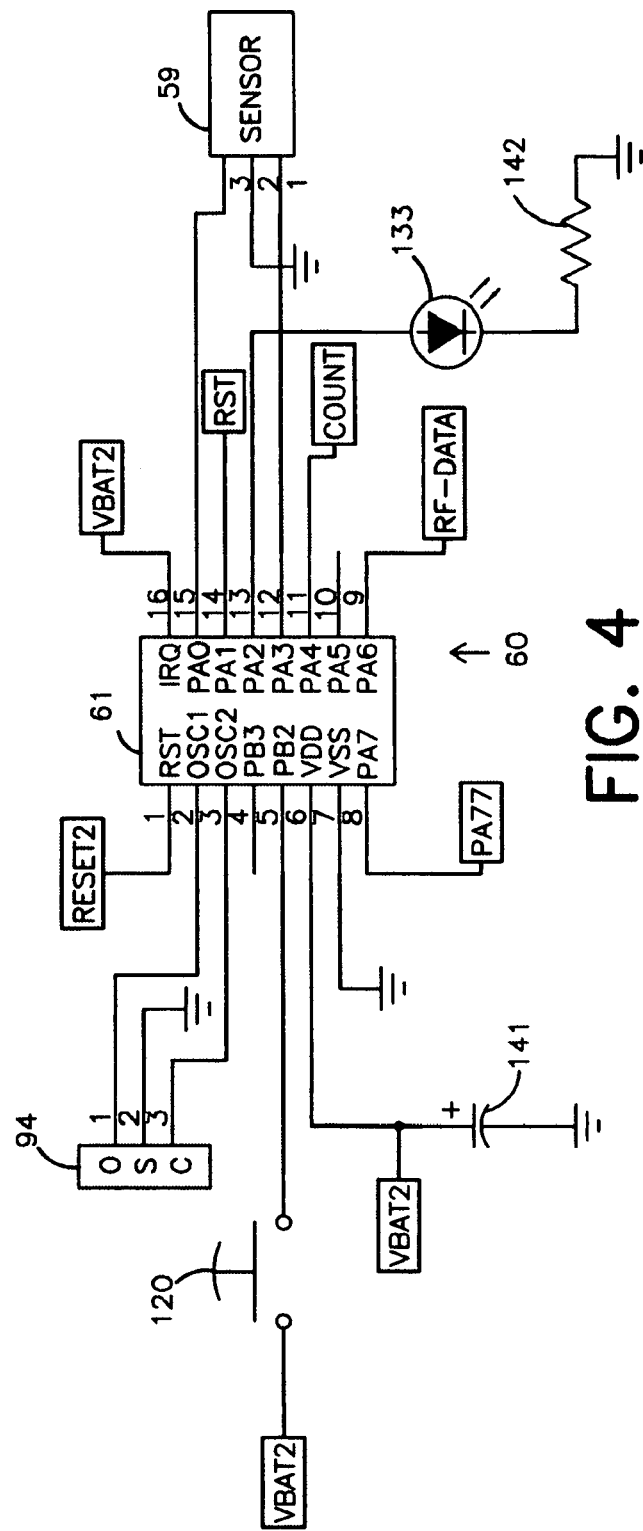
FIG. 3
FIG. 4

WIRELESS OBJECT COUNTER

This application is a continuation of application Ser. No. 10/635,403, filed Aug. 7, 2003, now U.S. Pat. No. 7,206,514.

A portion of the disclosure of this patent document contains material which is subject to copyright protection. The copyright owner has no objection to facsimile reproduction by anyone of the patent document or patent disclosure, as it appears in the Patent and Trademark Office patent file or records, but otherwise reserves all copyright rights whatsoever.

This invention relates to a wireless object counter and, more particularly, to a wireless object counter having its transmitter and receiver circuits powered by batteries with only a clock circuit in each of the transmitter and receiver circuits being continuously powered.

The use of a battery powered wireless object counter in which bursts of infrared (IR) pulses are transmitted is disclosed in U.S. Pat. No. 5,128,548 to Goodson et al. Goodson et al senses the breaking of a beam of IR pulses by an animal.

However, the transmitter and receiver circuits of Goodson et al have clock circuits of different frequencies and a microcomputer only in the receiver circuit. Thus, Goodson et al has no synchronization of the clock circuits of the transmitter and receiver circuits so that activation of the transmitter and receiver circuits can be synchronized through use of the clock circuits.

The wireless object counter of the present invention uses clock circuits of the same frequency so that activation of microcomputers of the transmitter and receiver circuits are synchronized. This results in additional saving of battery power.

Synchronization of the transmitter and receiver circuits occurs after the receiver circuit has received a burst of IR pulses from the transmitter circuit. This occurs every time that the receiver circuit receives a burst of IR pulses.

Synchronization is of the clock circuit of the receiver circuit with the clock circuit of the transmitter circuit. The operation of the transmitter circuit is independent of any activity of the receiver circuit.

This invention relates to a wireless object counter comprising a continuously cycling transmitter circuit and a receiver circuit separated from each other to provide a path therebetween along which objects to be counted move. The transmitter circuit has its operation independent of any activity of the receiver circuit. The transmitter circuit has a continuously operating clock circuit for causing a burst of a predetermined minimum number of infrared pulses as a beam during a predetermined period of time. The receiver circuit has a continuously operating clock circuit of the same frequency as the clock circuit of the transmitter circuit so that the clock circuit of the receiver circuit is synchronized with the clock circuit of the transmitter circuit only when the receiver circuit is to be activated for a cycle of operation to determine if the transmitted burst of a predetermined number of infrared pulses as a beam from the transmitter circuit is received. The receiver circuit is activated prior to the transmitter circuit transmitting a burst of a predetermined number of infrared pulses as a beam when the receiver circuit is to be activated for the cycle of operation. The receiver circuit has a counter for counting each time that the beam of the infrared pulses of each of the bursts of at least the predetermined minimum number of infrared pulses is interrupted by an object to be counted.

This invention also relates to a method of wireless counting of objects moving along a predetermined path comprising transmitting a beam of at least a predetermined minimum number of infrared pulses, under control of a continuously operating clock circuit of a continuously cycling transmitter circuit having its operation independent of any activity of a receiver circuit, from the transmitter circuit across the predetermined path during each cycle of operation of a receiver circuit so that the beam of at least the predetermined minimum number of infrared pulses will be blocked by an object moving along the predetermined path. The beam of at least the predetermined minimum number of infrared pulses is received at the receiver circuit disposed on the opposite side of the predetermined path from the transmitter circuit unless the beam of at least the predetermined minimum number of infrared pulses is blocked. The receiver circuit has a clock circuit of the same frequency as the clock circuit of the transmitter circuit and is synchronized therewith at least during each cycle of operation. Activating the receiver circuit occurs prior to transmission of the beam by the transmitter circuit of at least the predetermined minimum number of infrared pulses. Each time that the receiver circuit does not receive the beam of at least the predetermined minimum number of infrared pulses is counted and stored. Synchronizing the clock circuit of the receiver circuit with the clock circuit of the transmitter circuit occurs each time that the receiver circuit is to be activated for a cycle of operation.

The attached drawings illustrate an exemplary embodiment of the invention, in which:

FIG. 3 is a schematic circuit diagram of a further portion of the transmitter circuit of the wireless object counter of the present invention including a battery providing the power source for the transmitter circuit;

FIG. 4 is a schematic circuit diagram of a portion of a receiver circuit of the wireless object counter of the present invention including a microcomputer, an oscillator, a sensor for sensing each burst of IR pulses from the transmitter circuit and connected to the microcomputer, and a push button;

Figure 1:
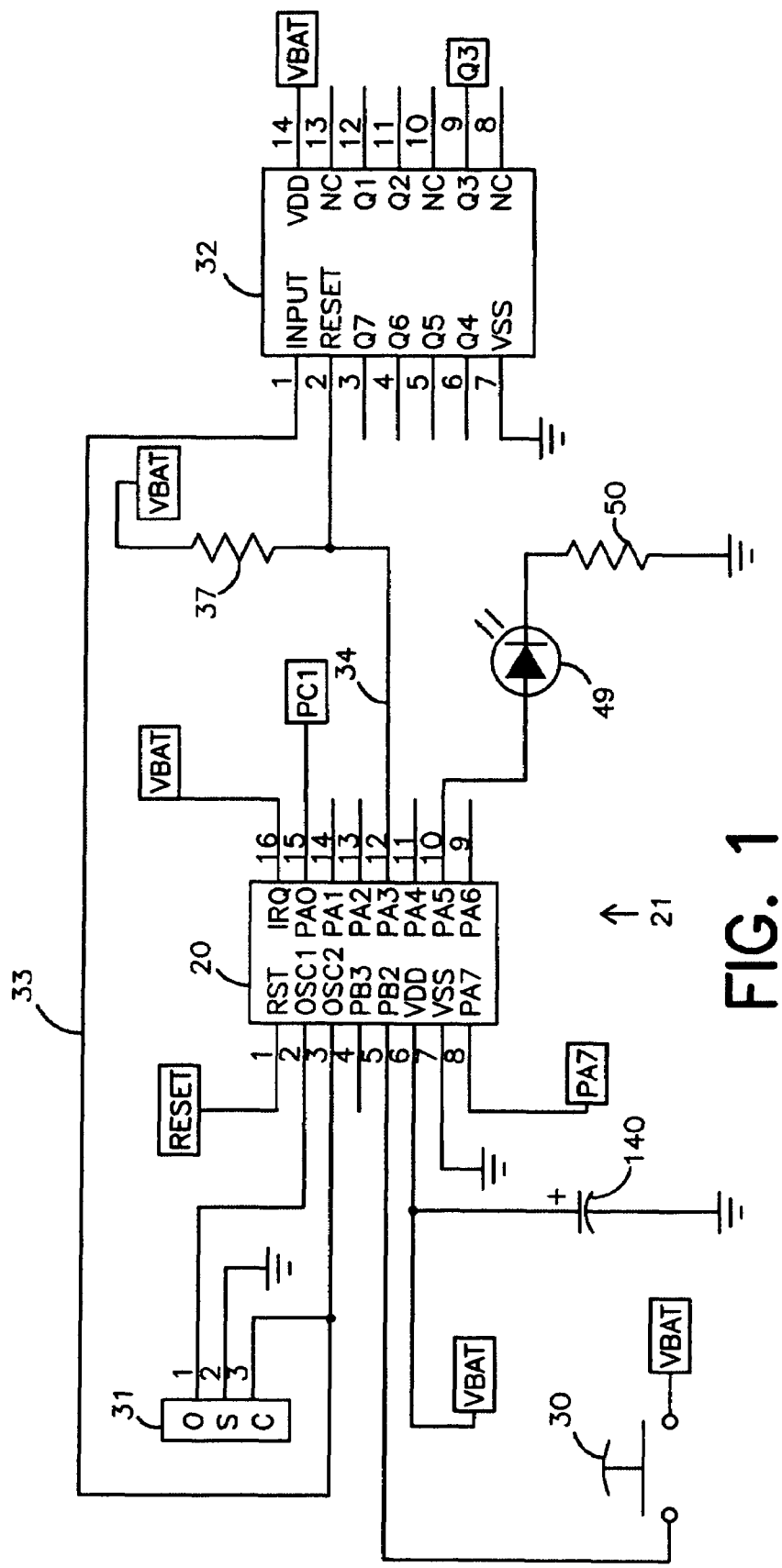
FIG. 1 is a schematic circuit diagram of a portion of a transmitter circuit of a wireless object counter of the present invention including a microcomputer, an oscillator, a binary divider, and a push button.

Referring to the drawings and particularly FIG. 1, a wireless object counter of the present invention includes a microcomputer 20 of a transmitter circuit 21. One suitable example of the microcomputer 20 is a microcomputer sold by Motorola, Inc. 1303 East Algonquin Road, Schaumburg, Ill. as model MC68HC705KJ1. It should be understood that any other suitable microcomputer may be employed, if desired.

The microcomputer 20 is activated every 1/16 second (62.5 milliseconds (ms)) by a RESET pulse supplied to its pin 1. The RESET pulse is continuously created every 62.5 ms by a clock circuit 22 (see FIG. 2).

The clock circuit 22 includes a crystal 23 having a frequency of 32.768 Khz. One suitable example of the crystal 23 is sold by Fox Electronics, 5570 Enterprise Parkway, Fort Myers, Fla. as model NC26-32.768-12.5. The crystal 23 is part of a parallel resonant circuit.

The clock circuit 22 also includes a 12-stage ripple carry binary divider 24. One suitable example of the binary divider 24 is sold by Fairchild Semiconductor, 7701 Las Colindas Ridge, Suite 400, Irving, Tex. as model CD4040BC. Any other suitable binary divider may used, if desired.

The binary divider 24 divides the output signal supplied from the parallel resonant circuit over a line 25 to its input pin 10 by 2,048 ($2^{11}$). This produces an output from a pin 15 of the binary divider 24 of precisely 16 pulses per second over a line 26.

Each pulse from the binary divider 24 is supplied over the line 26 to a pin 1 of a hex Schmitt trigger 27. One suitable example of the hex Schmitt trigger 27 is sold by Motorola, Inc. as model MM74C14M. Any other suitable hex Schmitt trigger may be utilized, if desired.

The output from a pin 2 of the hex Schmitt trigger 27 is fed to its pin 3 through a capacitor 28 to shape the signal. A resistor 29, which has a resistance of 22K ohms, is connected to ground and to the capacitor 28, which has a capacitance of 0.001 micro farad, with the pin 3 of the hex Schmitt trigger 27 connected therebetween. The output from a pin 4 of the hex Schmitt trigger 27 produces the RESET pulse, which is supplied to the pin 1 of the microcomputer 20 (see FIG. 1).

Each of the RESET pulses activates the microcomputer 20. As long as a push button 30 is in its open position as shown in FIG. 1, the microcomputer 20 uses a 3.58 MHz oscillator 31 to supply an input to a 7-stage ripple carry binary divider 32. The oscillator 31 also supplies the internal clock for the microcomputer 20 through pins 2 and 3 of the microcomputer 20.

One suitable example of the oscillator 31 is sold by Panasonic Industrial Company ECG, 15455 N.W. Greenbrier Parkway, Beaverton, Oreg. as model EF0-S3584E5. One suitable example of the binary divider 32 is sold by Fairchild Semiconductor as model CD4024BC. Any other suitable oscillator and binary divider may be employed, if desired.

The binary divider 32 divides the 3.58 Mhz frequency of the oscillator 31 supplied over a line 33 to an input pin 1 of the binary divider 32 by 8 ($2^3$). The binary divider 32 provides Q3 pulses from its output pin 9. The frequency of the Q3 pulses is 447.5 KHz (3.58 MHz/8).

The number of the Q3 pulses transmitted by the binary divider 32 over the pin 9 during each activation of the microcomputer 20 is controlled by an output pin 12 of the microcomputer 20. A line 34 connects the output pin 12 of the microcomputer 20 to a RESET pin 2 of the binary divider 32. The number of the Q3 pulses during each activation of the microcomputer 20 is a minimum of ten.

As shown in FIG. 3, a battery 35 is connected to a voltage input of a voltage converter 36, which increases the output voltage of the battery 35 from 3.65 volts to 5 volts (VBAT) at its voltage output pin 1. This voltage level is necessary to maintain the pulse to the input pin 1 of the binary divider 32 (see FIG. 1) when the battery 35 (see FIG. 3) weakens as it ages so that it no longer produces 3.65 volts.

VBAT is supplied to pins 6 and 16 of the microcomputer 20 (see FIG. 1) but only the pin 6 supplies power to the microcomputer 20. If the pin 16 of the microcomputer 20 is not maintained high by VBAT, the voltage level at the pin 16 might drop low enough to send an interrupt request to the software in the microcomputer 20 and interrupt the cycle of operation of the microcomputer 20.

VBAT is connected to the line 34 through a pull-up resistor 37, which has a resistance of 10K ohms, to hold the pin 2 of the binary divider 32 on until the pin 12 of the microcomputer 20 goes low under control of the internal clock of the microcomputer 20 after the ten Q3 pulses have been transmitted. This is in the source code (see Appendix I) of the software used in the microcomputer 20 and is indicated at decision 38 in FIG. 9. One-suitable example of the battery 35 (see FIG. 3) is sold as model LS14500 by SAFT, 12, rue SADI Carnot, 93170 BAGNOLET-FRANCE. One suitable example of the voltage converter 36 is sold as model LTC1754-5 by Linear Technology, 1630 McCarthy Road, Milpitas, Calif. Any other suitable battery and voltage converter may be used, if desired.

Each of the Q3 (see FIG. 1) pulses from the output pin 9 of the binary divider 32 is supplied to a pin 11 (see FIG. 2) of the hex Schmitt trigger 27. An output pin 10 of the hex Schmitt trigger 27 is connected through a capacitor 40, which has a capacitance of 100 pico farads, through a line 43 to an input pin 13 of the hex Schmitt trigger 27. Resistors 41 and 42, which have resistances of 3.3K and 22K ohms, respectively, are connected to the line 43 to control the power level supplied by the Q3 pulses to the input pin 13 of the hex Schmitt trigger 27.

The power level is adjusted in accordance with the length of time that the push button 30 (see FIG. 1) is held in its closed position. If the push button 30 is held in its closed position for more than four seconds and no more than six seconds as disclosed at decisions 43A and 43B, respectively, in FIG. 10, then the high power mode is selected as indicated at step 44. Closing of the push button 30 (see FIG. 1) for more than four seconds and no more than six seconds results in an output signal PC1 on a pin 15 of the microcomputer 20 being set to a disconnected state.

It should be understood that closing of the push button 30 causes a pin 5 of the microcomputer 20 to go high since it is connected to VBAT by the closed push button 30. The period of time that the pin 5 of the microcomputer 20 is high determines the specific mode in which the microcomputer 20 functions under control of the software in the microcomputer 20.

When the high power mode is selected, the software in the microcomputer 20 causes the output signal PC1 on the pin 15 of the microcomputer 20 to be driven to a disconnected state so that the PC1 signal is the equivalent of an open circuit. This results in the resistor 41 (see FIG. 2) being disconnected so that the resistor 42 alone supplies the charge current to cause the capacitor 40 to be charged slower to increase the width of each of the Q3 pulses to provide more power to an IR LED 45.

Each of the Q3 pulses is supplied from an output pin 12 of the hex Schmitt trigger 27 to an FET 46 to turn on the FET 46. The increased width of the Q3 pulses increases the time that the FET 46 is turned on so that current is supplied to the IR LED 45 for a longer period of time.

The current is supplied to the IR LED 45 from a capacitor 48, which is connected to ground and charged by VBAT from the voltage converter 36 (see FIG. 3) when the FET 46 (see FIG. 2) is turned off, and then through a resistor 47, which has a resistance of 0.68 ohms, and the turned on FET 46 to ground. The capacitor 48 has a capacitance of 100 micro farads.

Figure 10:
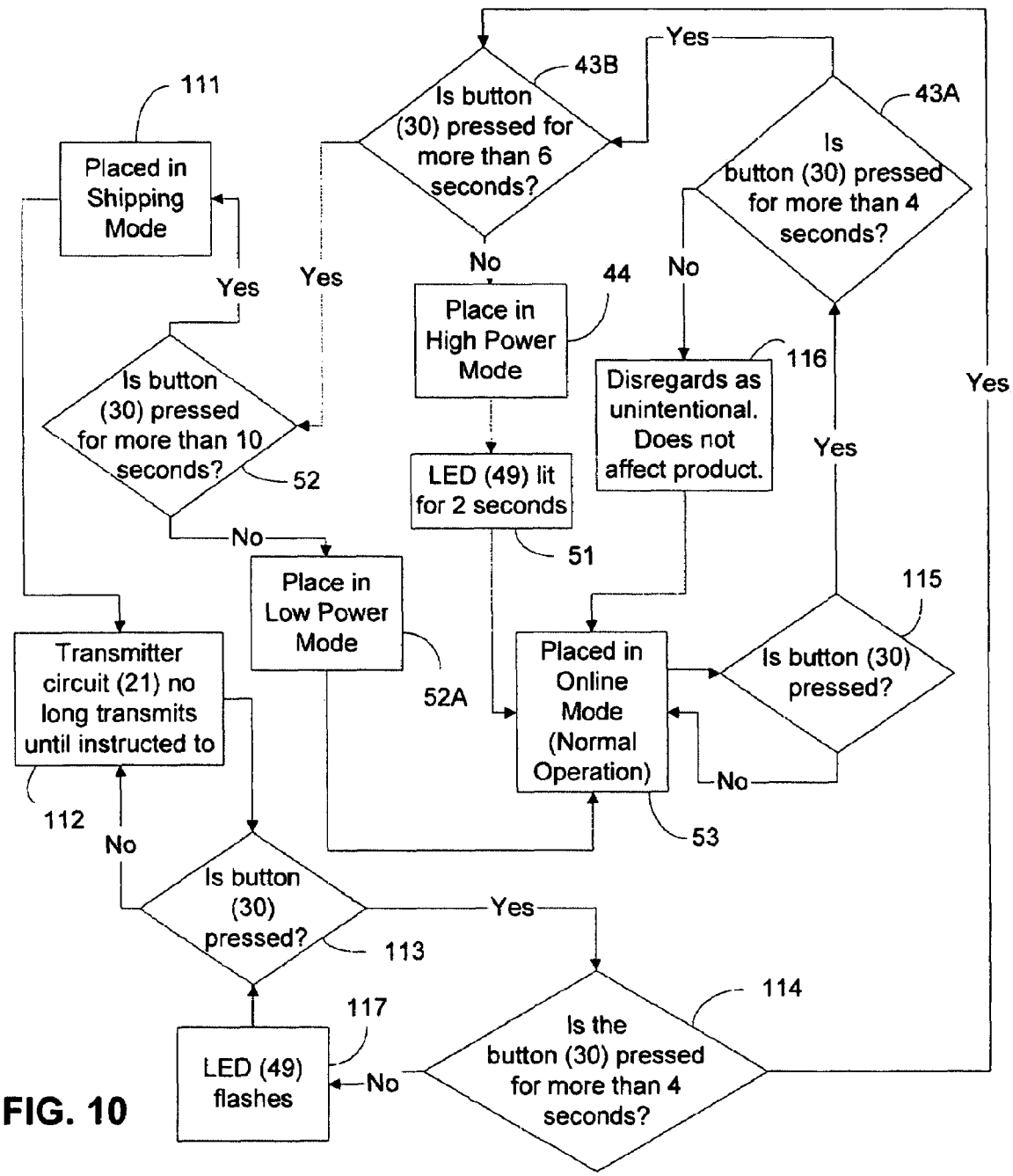
FIG. 10 is a flow chart disclosing the power options for powering the IR LED created by the time that the push button of the transmitter circuit is held in its closed position.

When the high power mode is selected through the push button 30 (see FIG. 1) being held in its closed position for more than four seconds and no more than six seconds, an LED 49, which is connected to ground through a resistor 50 having a resistance of 2.2K ohms, is lit for two seconds as shown in FIG. 10 at step 51. This denotes the high power mode setting.

When the push button 30 (see FIG. 1) is held in its closed position for more than six seconds and no more than ten seconds, a low power mode is selected for transmission through the IR LED 45 (see FIG. 2) as shown in FIG. 10 at decision 52 and step 52A. When the low power mode is selected, the software in the microcomputer 20 (see FIG. 1) causes the output signal PC1 on the pin 15 of the microcomputer 20 to be driven to a connected high state so that the PC1 signal is no longer the equivalent of an open circuit. This results in the capacitor 40 (see FIG. 2) being charged more quickly from the PC1 signal, which also is 5 volts, through the resistor 41 and VBAT through the resistor 42; this supply of current through both the resistors 41 and 42 provides a greater charging current than when the resistor 42 alone is used during the high power mode. This produces each of the Q3 pulses with a smaller width so that less power is supplied to the IR LED 45 due to the FET 46 being turned on for a short period of time. This supplies a lower current to the IR LED 45 to reduce its brightness whereby its effective range is reduced. However, this low power level significantly reduces the use of the battery 35 (see FIG. 3) to increase its life since less power is drawn by the microcomputer 20 (see FIG. 1).

One suitable example of the FET 46 (see FIG. 2) is an FET sold by Fairchild Semiconductor as model NDS335N. One suitable example of the IR LED 45 is sold as model TSHF5400 by Vishay Americas, 1 Greenwich Place, Shelton, Conn. Any other suitable FET and IR LED may be used, if desired.

After the push button 30 (see FIG. 1) is released from its closed position to its open position following selection of a different power level, the transmitter circuit 21 returns directly to its normal operation (online mode). This is shown at step 53 in FIG. 10 for either of the two power level settings.

While the ideal input to the specific IR LED 45 (see FIG. 2) of Vishay is a frequency of 455 KHz with a waveform consisting of an on/off ratio of 50/50, the Q3 pulses are provided at a frequency of 447.5,KHz with the same 50/50 ratio when the high power mode is selected. This complies with the specification for the specific IR LED 45 of Vishay to achieve the desired results.

The IR LED 45 receives 1 to 1.5 amps during each of the ten cycles of time that it is on during the entire cycle of 23 micro seconds ($\mu$s). It should be understood that the current to the IR LED 45 may have a range other than 1 to 1.5 amps. This variation is accomplished by changing the resistance of the resistor 47 during manufacture or by the use of a potentiometer as the resistor 47.

The IR LED 45 is only powered for approximately 11.5 $\mu$s due to the 50/50 ratio. While an LED is normally damaged if operated at over 100 milliamps, the short time period that the current is applied during each cycle prevents the IR LED 45 from being damaged to enable an effective burst of IR pulses to be transmitted.

Since the IR LED 45 is only energized for 11.5 $\mu$s out of every 62.5 ms for each cycle, an extremely low average current is consumed by the IR LED 45. This extends the life of the battery 35 (see FIG. 3).

In the low power mode, the waveform has an on/off ratio of 10/90 with the resistor 42 (see FIG. 2) having the resistance of 22K ohms. An increase in the on/off ratio from 10/90 could be obtained, if desired, by changing the resistance of the resistor 42 but this would use more power from the battery 35 (see FIG. 3) to decrease its life.

As previously mentioned, the crystal 23 (see FIG. 2) is part of a parallel resonant circuit. The parallel resonant circuit includes an unbuffered inverter 54 having a resistor 55, which has a resistance of 10 MEG ohms, connected to its input pin 2. The resistor 55 also is connected to the line 25. The inverter 54 has its pin 5 connected to VBAT through a resistor 56, which has a resistance of 100K ohms, to provide voltage to the inverter 54. A resistor 57, which has a resistance of 100K ohms, is connected between one side of the crystal 23 and output pin 4 of the inverter 54.

The resistor 55 forces the inverter 54 into its linear mode of operation. The resistor 57 limits current available to the crystal 23.

A resistor 58, which has a resistance of 100K ohms, is connected to ground and through capacitors 58A and 58B to opposite sides of the crystal 23. The capacitors 58A and 58B, which each has a capacitance of 27 pico farads, prevent high level loading of the parallel resonant circuit to prevent harmonic oscillation. The capacitors 58A and 58B also assist in starting oscillation of the crystal 23.

The resistors 56 and 58 have the same resistance to keep the signal valid for CMOS parts. The CMOS part operates from the center of its signal so that reduction of its signal must be equal around the center of its signal.

The use of the resistor 56 lowers the operating level of the parallel resonant circuit and significantly reduces the power used by the parallel resonant circuit.

Without the resistors 56 and 58, the parallel resonant circuit tremendously increases the use of power. Since only the clock circuit 22 is continuously operating, its power usage must be minimized as occurs through the use the resistors 56 and 58.

One suitable example of the inverter 54 is an unbuffered tiny logic HS inverter sold by Fairchild Semiconductor as model MC75SU04. Any other suitable unbuffered inverter may be used, if desired. While the parallel resonant circuit is suggested by Fox Electronics, which sells the unbuffered inverter 54, it does not suggest the use of the resistors 56 and 58.

A sensor 59 (see FIG. 4) of a receiver circuit 60 is positioned to sense each of the bursts of the IR pulses transmitted by the IR LED 45 (see FIG. 2) of the transmitter circuit 21. The IR LED 45 and the sensor 59 (see FIG. 4), which is an infrared receiver, are spaced from each other to provide a predetermined path therebetween along which each object to be counted moves. For example, it could be a path along which a person would move in a retail store or a specific department of the store. One suitable example of the sensor 59 is a sensor sold as model TSOP7000 by Vishay Americas, 1 Greenwich Place, Shelton, Conn.

The sensor 59 provides a pulse as its output signal over its pin 1 to a pin 12 of a microcomputer 61. The microcomputer 61 of the receiver circuit 60 is the same as the microcomputer 20 (see FIG. 1) of the transmitter circuit 21.

The pulse is supplied from the sensor 59 (see FIG. 4) only if the sensor 59 sees both the leading and trailing edges of each of the at least ten IR pulses produced by the IR LED 45 (see FIG. 2) during each cycle of operation of the microcomputer 20 (see FIG. 1). The microcomputer 61 (see FIG. 4) supplies power (an IR-PWR signal) over its pin 15 to a pin 3 of the sensor 59.

The receiver circuit 60 includes a clock circuit 62 (see FIG. 5), which is the same as the clock circuit 22 (see FIG. 2) of the transmitter circuit 21. The clock circuit 62 (see FIG. 5) includes a crystal 63, which is the same as the crystal 23 (see FIG. 2) of the clock circuit 22.

The clock circuit 62 (see FIG. 5), which has the same parallel resonant circuit as the clock circuit 22 (see FIG. 2) of the transmitter circuit 21, also includes a 12-stage ripple carry binary divider 64 (see FIG. 5), which is the same as the 12-stage ripple carry binary divider 24 (see FIG. 2) of the transmitter circuit 21. The binary divider 64 (see FIG. 5) divides the output signal supplied from the parallel resonant circuit over a line 65 (see FIG. 5) to its input pin 10 by 2,048 ($2^{11}$).

Accordingly, the output of the binary divider 64 of precisely 16 pulses each second is supplied from its pin 15 over a line 66 to a pin 1 of a hex Schmitt trigger 67, which is the same as the hex Schmitt trigger 27 (see FIG. 2) of the trans-mitter circuit 21. This functions in the same manner through a capacitor 68 (see FIG. 5), which has a capacitance of 0.001 micro farad, and a resistor 69, which has a resistance of 22K ohms, to provide RESET2 pulse at pin 4 of the hex Schmitt trigger 67.

The RESET2 pulse is supplied to a pin 1 of the microcomputer 61 (see FIG. 4) to reset the microcomputer 61. This activates the microcomputer 61 and the sensor 59 to enable the microcomputer 61 to receive an IR signal from the sensor 59. The output pulse is produced by the sensor 59 on its pin 1 only when both the leading and trailing edges of each of the ten IR pulses are sensed by the sensor 59 due to the beam of the burst of the at least ten IR pulses from the IR LED 45 (see FIG. 2) of the transmitter circuit 21 not being broken.

Figure 7:
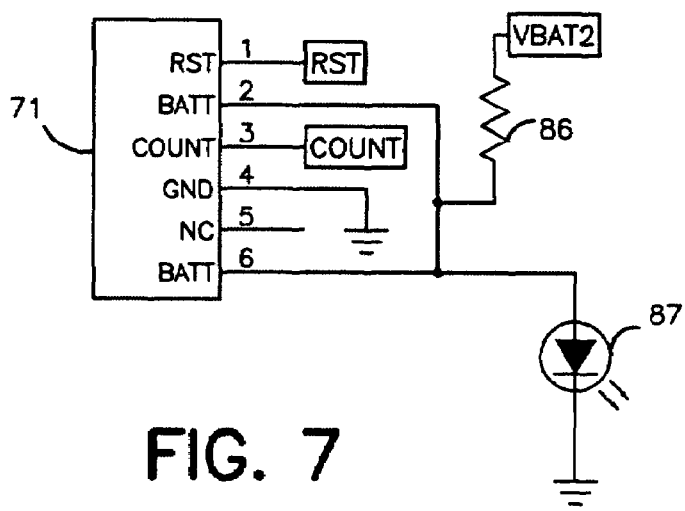
FIG. 7 is a schematic block diagram of a display counter of the wireless object counter of the present invention showing the number of objects counted.
Figure 11:
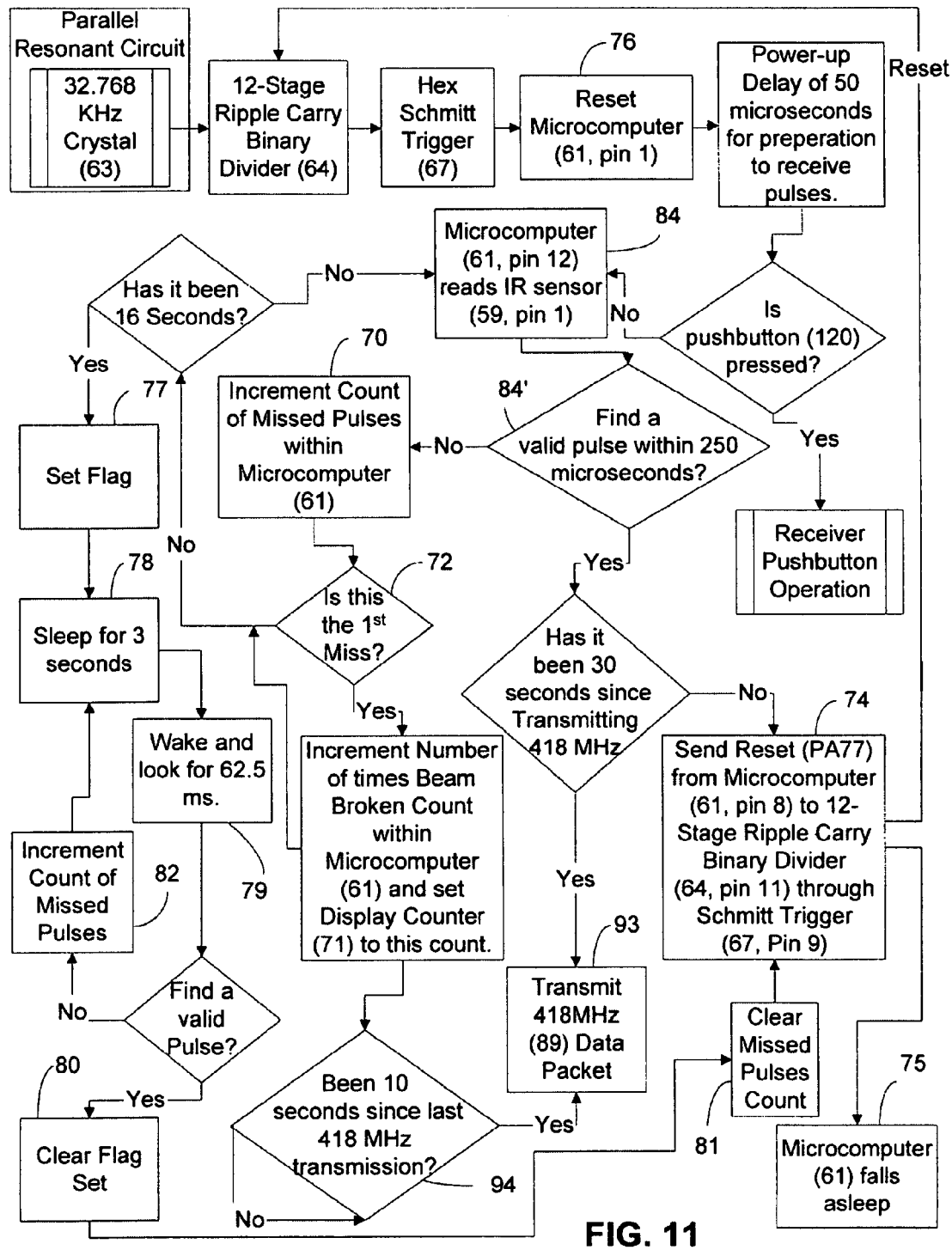
FIG. 11 is a flow chart showing how the microcomputer of the receiver circuit functions and synchronizes the microcomputer of the receiver circuit with the microcomputer of the transmitter circuit.

If no signal is received from the sensor 59 (see FIG. 4) so that the beam of the burst of the ten IR pulses from the IR LED 45 (see FIG. 2) is broken, then the microcomputer 61 (see FIG. 4) increments the count within the microcomputer 61 as shown at step 70 in FIG. 11. If this is the first miss, then the microcomputer 61 (see FIG. 4) sends a COUNT pulse, which indicates no signal received from the sensor 59, through its pin 11 to a pin 3 of a display counter 71 (see FIG. 7), which is a liquid crystal display (LCD). This COUNT pulse is a count of an object such as a person, for example, blocking the beam of the burst of the ten IR pulses from the IR LED 45 (see FIG. 2).

One suitable example of the LCD is sold by Trumeter Co., Inc., 1020 N.W. 6th Street, Suite D, Deerfield Beach, Fla. as model 7016SP. Any other suitable LCD may be used, if desired.

It should be understood that no further COUNT pulse is sent to the display counter 71 (see FIG. 7) by the microcomputer 61 (see FIG. 4) until a signal is again received by the microcomputer 61 from the sensor 59 to indicate that the beam of the burst of the at least ten IR pulses from the IR LED 45 (see FIG. 2) is no longer broken by the object. This is indicated by decision 72 in FIG. 11.

Figure 5:
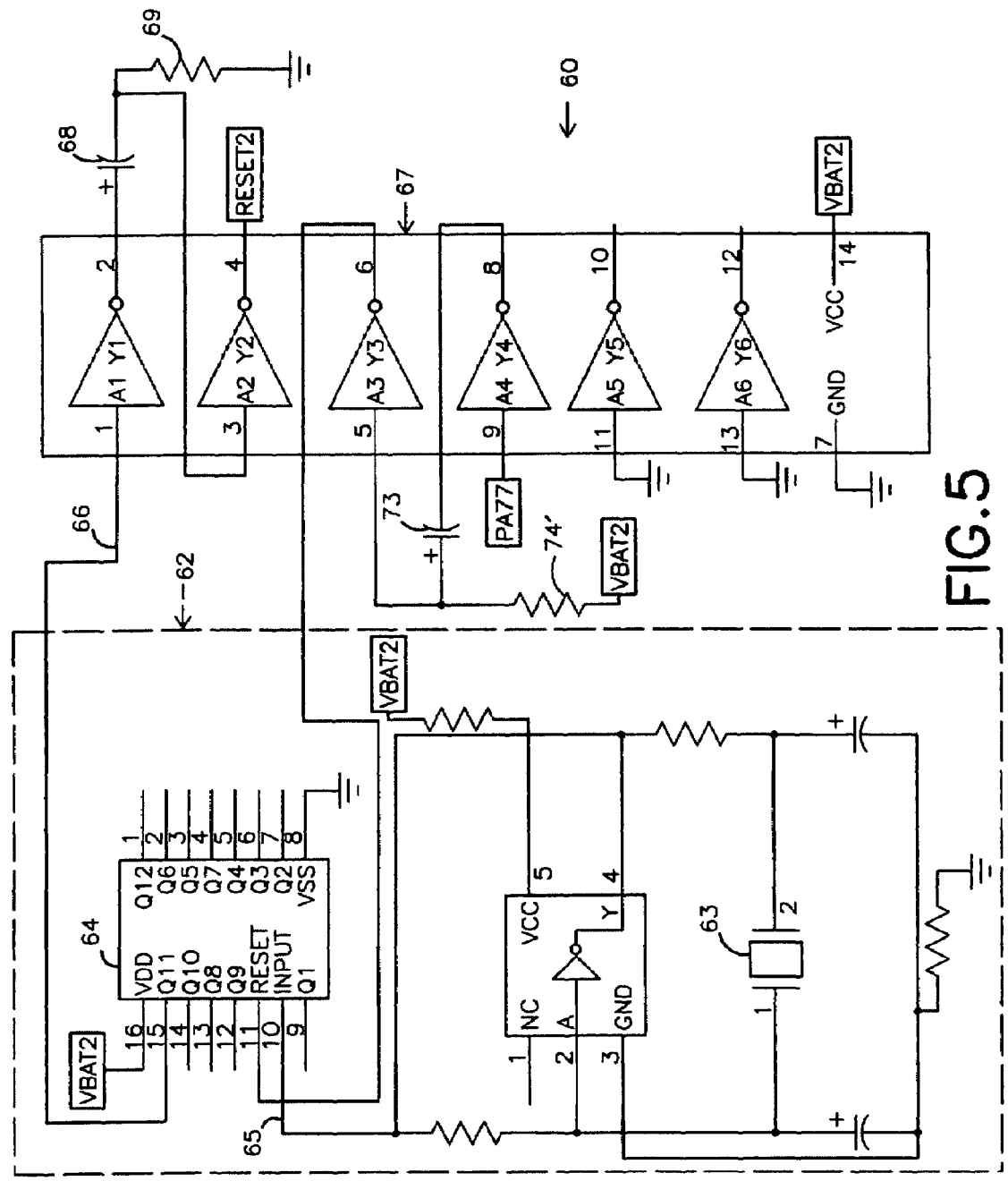
FIG. 5 is a schematic circuit diagram of another portion of the receiver circuit of the wireless object counter of the present invention including a clock circuit and a hex Schmitt trigger.

If the IR signal from the sensor 59 (see FIG. 4) is received by the microcomputer 61 to indicate that the beam of the burst of the at least ten IR pulses from the IR LED 45 (see FIG. 2) has not been broken, the microcomputer 61 (see FIG. 4) generates a PA77 signal on its pin 8 for supply to a pin 9 of the hex Schmitt trigger 67 (see FIG. 5). As a result, the PA77 signal passes through a capacitor 73, which has a capacitance of 0.001 micro farad, and pins 5 and 6 of the hex Schmitt trigger 67 to a reset pin 11 of the binary divider 64 as indicated at step 74 in FIG. 11. VBAT2 is applied through a pull-up resistor 74' (see FIG. 5), which has a resistance of 2.2K ohms, to maintain the capacitor 73 charged.

At the same time that the PA77 signal is generated by the microcomputer 61 (see FIG. 4), the microcomputer 61 goes to sleep as disclosed at step 75 in FIG. 11. The PA77 signal at the reset pin 11 of the binary divider 64 (see FIG. 5) of the clock circuit 62 clears the binary divider 64 so that it begins to count for another 1/16 second before it again generates a signal on its pin 15 over the line 66 to supply the RESET2 signal to the pin 1 of the microcomputer 61 (see FIG. 4) as indicated at step 76 in FIG. 11.

If the microcomputer 61 (see FIG. 4) does not receive an output pulse from the sensor 59 each 1/16 second for 16 seconds, then a flag is set in the microcomputer 61 as shown at step 77 in FIG. 11, and the microcomputer 61 (see FIG. 4) goes to sleep for three seconds as disclosed at step 78 in FIG. 11. As shown at step 79 in FIG. 11, the microcomputer 61 (see FIG. 4) then wakes up and looks for 62.5 ms for a signal from the sensor 59. If the microcomputer 61 finds the output pulse from the sensor 59, then the microcomputer 61 clears the flag as indicated at step 80 in FIG. 11 and clears the missed pulses count in the microcomputer 61 as disclosed at step 81 in FIG. 11.

If the microcomputer 61 (see FIG. 4) does not find the output pulse from the sensor 59, then the microcomputer 61 increments the count of missed bursts of IR pulses as shown at step 82 in FIG. 11. It then goes to sleep for three seconds again as the step 78 discloses in FIG. 11.

Accordingly, the transmitter circuit 21 (see FIG. 1) is a totally independent circuit since none of its activities is based on the activity of the receiver circuit 60 (see FIG. 4). However, the receiver circuit 60 depends upon the transmitter circuit 21 (see FIG. 1) for its entire activity. This is because the entire activity of the receiver circuit 60 (see FIG. 4) is dependent upon reception by the sensor 59 of each of the bursts of the ten IR pulses transmitted by the IR LED 45 (see FIG. 2) of the transmitter circuit 21.

The receiver circuit 60 (see FIG. 4) synchronizes the clock circuit 62 (see FIG. 5) with the clock circuit 22 (see FIG. 2) of the transmitter circuit 21 each time that the sensor 59 (see FIG. 4) detects each of the bursts of the at least ten IR pulses transmitted by the IR LED 45 (see FIG. 2) of the transmitter circuit 21. This synchronization enables the receiver circuit 60 (see FIG. 4) to know when the IR LED 45 (see FIG. 2) of the transmitter circuit 21 will next transmit the burst of the ten IR pulses.

Figure 9:
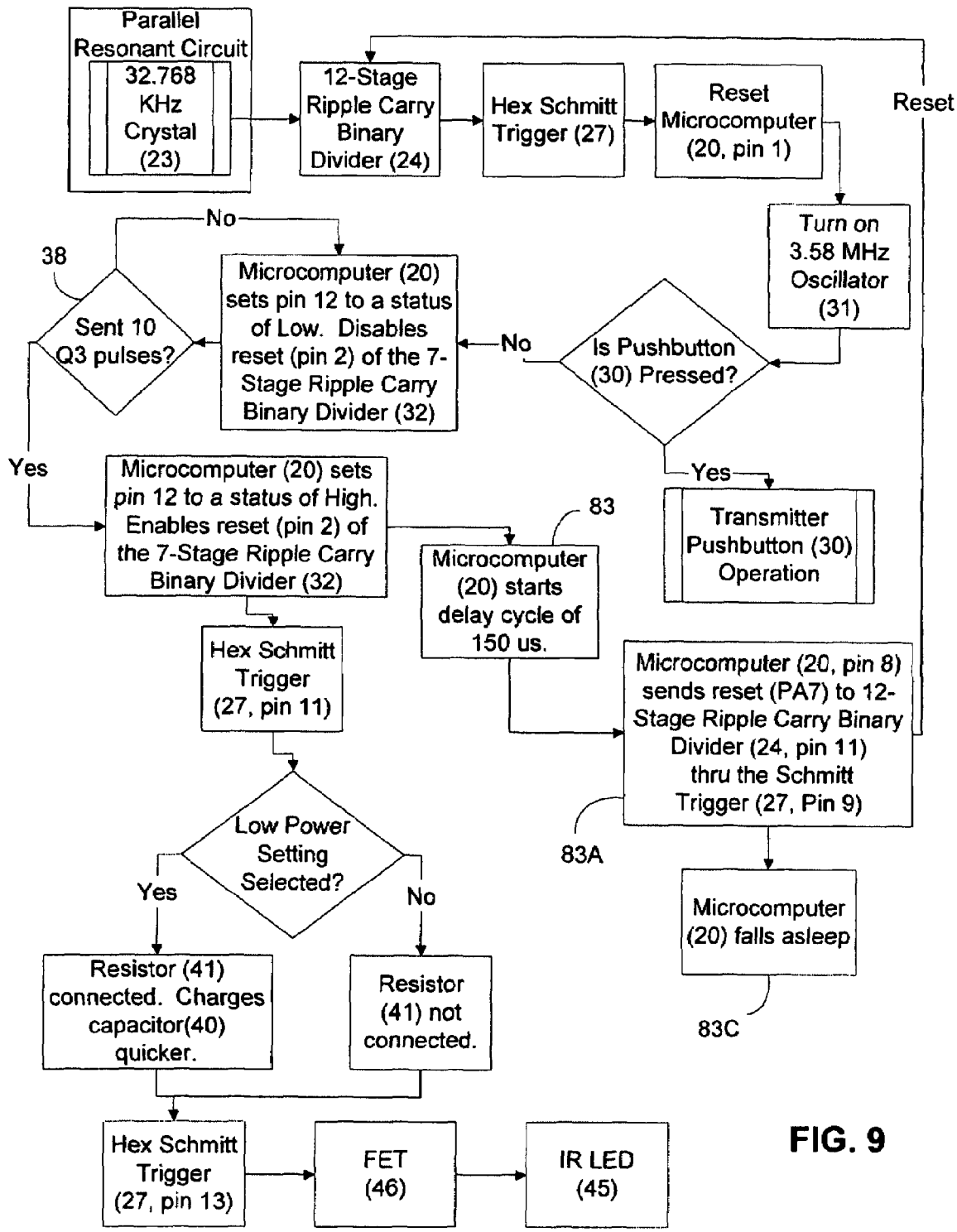
FIG. 9 is a flow chart showing how bursts of IR pulses are transmitted by the IR LED of the transmitter circuit under control of the microcomputer of the transmitter circuit.
Figure 14:
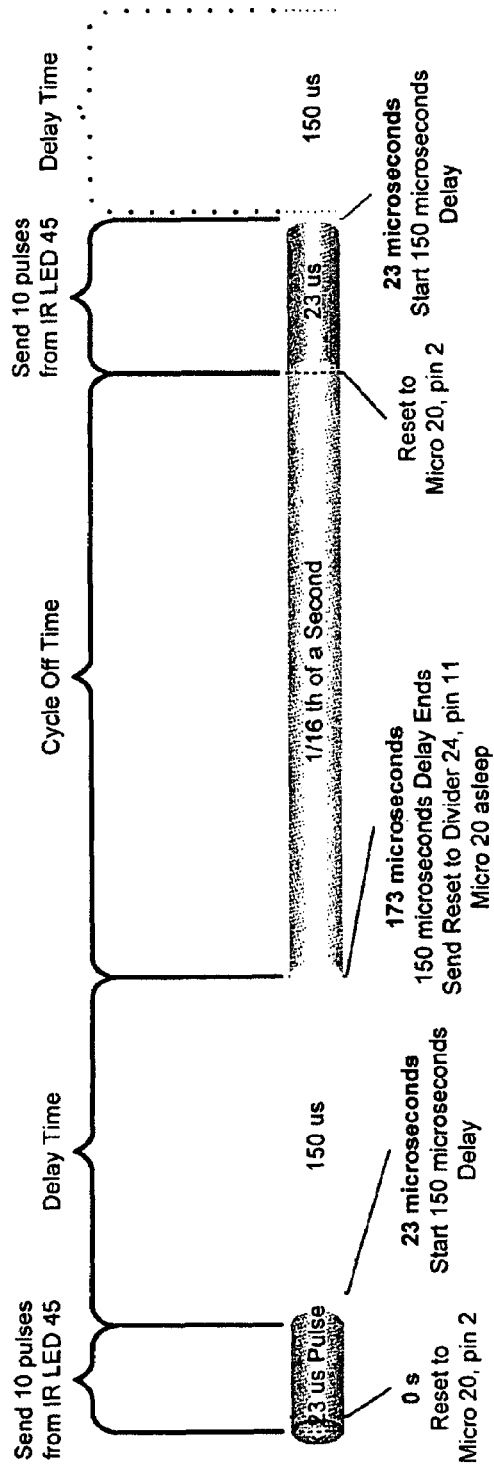
FIG. 14 is a timing diagram showing the relationship between the microcomputer of the transmitter circuit and the microcomputer of the receiver circuit when a beam of infrared pulses from an IR LED of the transmitter circuit is not blocked by an object to be counted.
Figure 14:
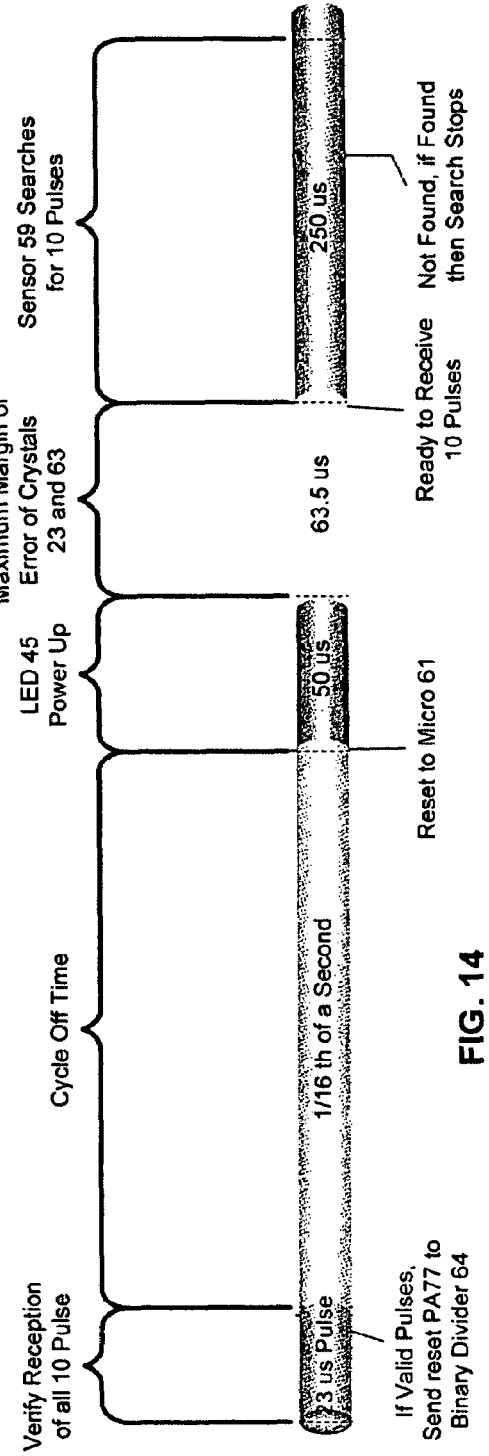

As shown at step 83 in FIG. 9 and in FIG. 14, there is always a delay of 150 μs when starting the next cycle of the microcomputer 20 (see FIG. 1) of the transmitter circuit 21 after the microcomputer 61 (see FIG. 4) of the receiver circuit 60 is activated. This insures that the microcomputer 61 of the receiver circuit 60 is turned on 150 μs prior to the microcomputer 20 (see FIG. 1) of the transmitter circuit 21 being activated.

This delay of 150 μs in activating the microcomputer 20 compensates for two potential errors. The first is that there is a maximum possible error of 31.75 μs due to the 32.768 KHz crystal 23 (see FIG. 2) of the transmitter circuit 21 and 31.75 μs due to the 32.768 KHz crystal 63 (see FIG. 5) of the receiver circuit 60. Thus, there is a delay of 63.5 μs for maximum possible error due to the crystals 23 (see FIG. 2) and 63 (see FIG. 5) each time that a reset signal (RESET and RESET2, respectively) is sent.

There also is a 50 μs time for the IR LED 45 (see FIG. 2) of the transmitter circuit 21 to power up. This is a total of 113.5 μs for the transmitter circuit 21 and the receiver circuit 60 (see FIG. 4) to have the proper timing relation. Accordingly, a total of 150 μs is utilized for further insurance that the sensor 59 of the receiver circuit 60 will always be ready to receive each of the bursts of the ten IR pulses transmitted by the IR LED 45 (see FIG. 2) of the transmitter circuit 21 during each cycle of operation of the receiver circuit 60 (see FIG. 4).

As shown in FIG. 14, each time that the sensor 59 (see FIG. 4) senses at least the ten pulses from the IR LED 45 (see FIG. 2) so that the sensor 59 (see FIG. 4) produces a signal indicating this to the pin 15 of the microcomputer 61, the binary divider 64 (see FIG. 5) receives a reset signal (PA77) at its pin 11 from the pin 8 of the microcomputer 61 (see FIG. 4) to start the 1/16 second time period before the next activation of the microcomputer 61.

Figure 2:
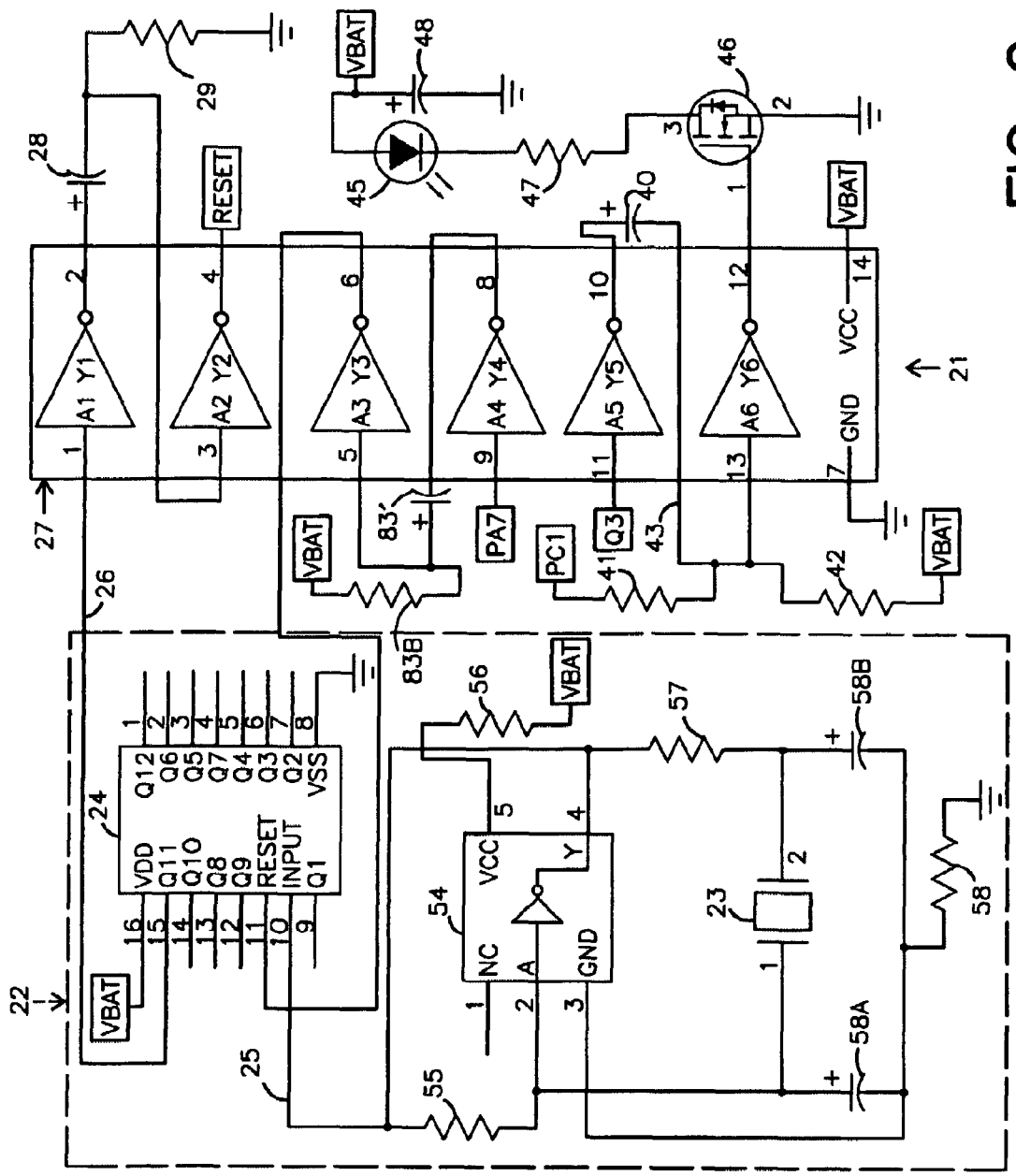
FIG. 2 is a schematic circuit diagram of another portion of the transmitter circuit of the wireless object counter of the present invention including a clock circuit, a hex Schmitt trigger, and an IR LED transmitting each burst of IR pulses.

At the same time, there is a delay of 150 μs in the software of the microcomputer 20 (see FIG. 1) before the microcomputer 20 generates a PA7 signal on its pin 8 for supply to a pin 9 of the hex Schmitt trigger 27 (see FIG. 2). As a result, the PA7 signal passes through a capacitor 83', which has a capacitance of 0.001 micro farad, and pins 5 and 6 of the hex Schmitt trigger 27 to the pin 11 of the binary divider 24 as shown at step 83A in FIG. 9. VBAT is applied through a pull-up resistor 83B (see FIG. 2), which has a resistance of 2.2K ohms, to maintain the capacitor 83' charged. The microcomputer 20 (see FIG. 1) also goes to sleep as indicated at step 83C in FIG. 9.

The transmitter circuit 21 (see FIG. 1) continues to function in the manner shown in FIG. 14 even if the sensor 59 (see FIG. 4) of the receiver circuit 60 does not sense at least ten of the pulses from the IR LED 45 (see FIG. 2). This is because there is no reset (PA77) signal sent to the binary divider 64 (see FIG. 5) if the sensor 59 (see FIG. 4) of the receiver circuit 60 does not sense at least ten of the pulses from the IR LED 45 (see FIG. 2).

It should be understood that there is synchronization of the clock circuit 62 (see FIG. 5) of the receiver circuit 60 only each time that the sensor 59 (see FIG. 4) produces an output signal. However, the delay time of 150 μs occurs each time that the IR LED 45 (see FIG. 2) completes sending of the ten pulses. When the sensor 59 (see FIG. 4) next senses the ten pulses from the IR LED 45 (see FIG. 2), its signal again synchronizes the clock circuit 62 (see FIG. 4) of the receiver circuit 60 with the clock circuit 22 (see FIG. 2) of the transmitter circuit 21.

It should be understood that the delay time of 150 μs could be used in the transmitter circuit 21 after the reset signal (PA7) is sent to the pin 11 of the binary divider 24 and the microcomputer 20 has been awakened from its sleep rather than as shown in FIG. 14. Synchronization would still occur when the sensor 59 (see FIG. 4) senses the ten Q3 pulses from the IR LED 45 (see FIG. 2).

If the ten pulses from the IR LED 45 are not sensed by the sensor 59 (see FIG. 4), then the microcomputer 61 of the receiver circuit 60 continues to attempt to read the sensor 59 as shown at step 84 in FIG. 11. If a valid pulse is not found within 250 μs, as indicated by decision 84' in FIG. 11, then the count of missed pulses within the microcomputer 61 (see FIG. 4) is incremented as disclosed at the step 70 in FIG. 11. This continues until 16 seconds has elapsed without a reading being obtained from the sensor 59 (see FIG. 4) before the microcomputer 61 goes to sleep as indicated at the step 78 in FIG. 11.

Therefore, there is no synchronization of the microcomputer 61 (see FIG. 4) with the microcomputer 20 (see FIG. 1) of the transmitter circuit 21 until there is again a valid signal from the sensor 59 (see FIG. 4) indicating that ten pulses from the IR LED 45 (see FIG. 2) have been sensed. When this occurs, there is again synchronization of the microcomputer 61 (see FIG. 4) with the continuously cycling microcomputer 20 (see FIG. 1) of the transmitter circuit 21.

Figure 6:
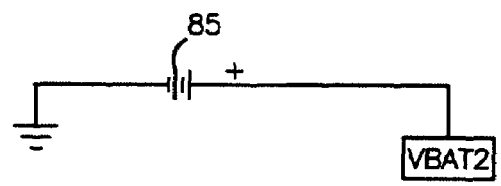
FIG. 6 is a schematic circuit diagram of a further portion of a receiver circuit of the wireless object counter of the present invention including a battery used for powering the receiver circuit.

The microcomputer 61 (see FIG. 4) of the receiver circuit 60 is powered from a battery 85 (see FIG. 6). The output voltage from the battery 85 is identified as VBAT2, which is supplied to pins 6 and 16 of the microcomputer 61 (see FIG. 4) but only the pin 6 supplies power to the microcomputer 61. If the pin 16 of the microcomputer 61 is not maintained high by VBAT2, the voltage level at the pin 16 might drop low enough to send an interrupt request to the software (See Appendix II for source code.) in the microcomputer 61 and interrupt the cycle of operation of the microcomputer 61.

VBAT2 also is supplied to pin 16 of the binary divider 64 (see FIG. 5) and through a resistor 86 (see FIG. 7), which has a resistance of 1 MEG ohm, to pins 2 and 6 of the display counter 71. An LED 87 is connected to ground so that current flows therethrough when VBAT2 is supplied to the display counter 71.

Figure 8:
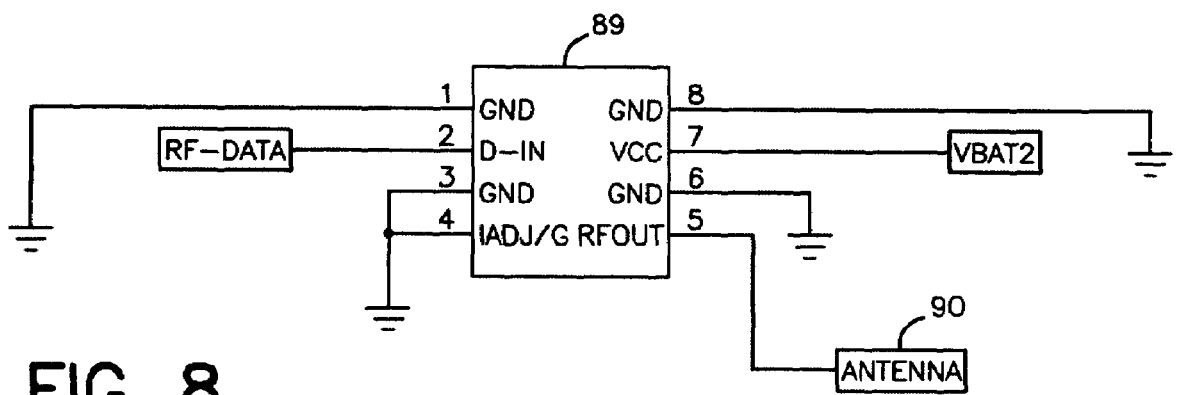
FIG. 8 is a schematic block diagram of a radio frequency (RF) transmitter of the wireless object counter of the present invention transmitting the count.

VBAT2 also is supplied to a radio frequency (RF) transmitter 89 (see FIG. 8) having a frequency of 418 MHz. It should be understood that the RF transmitter 89 may have any other suitable frequency, if desired.

Figure 13:
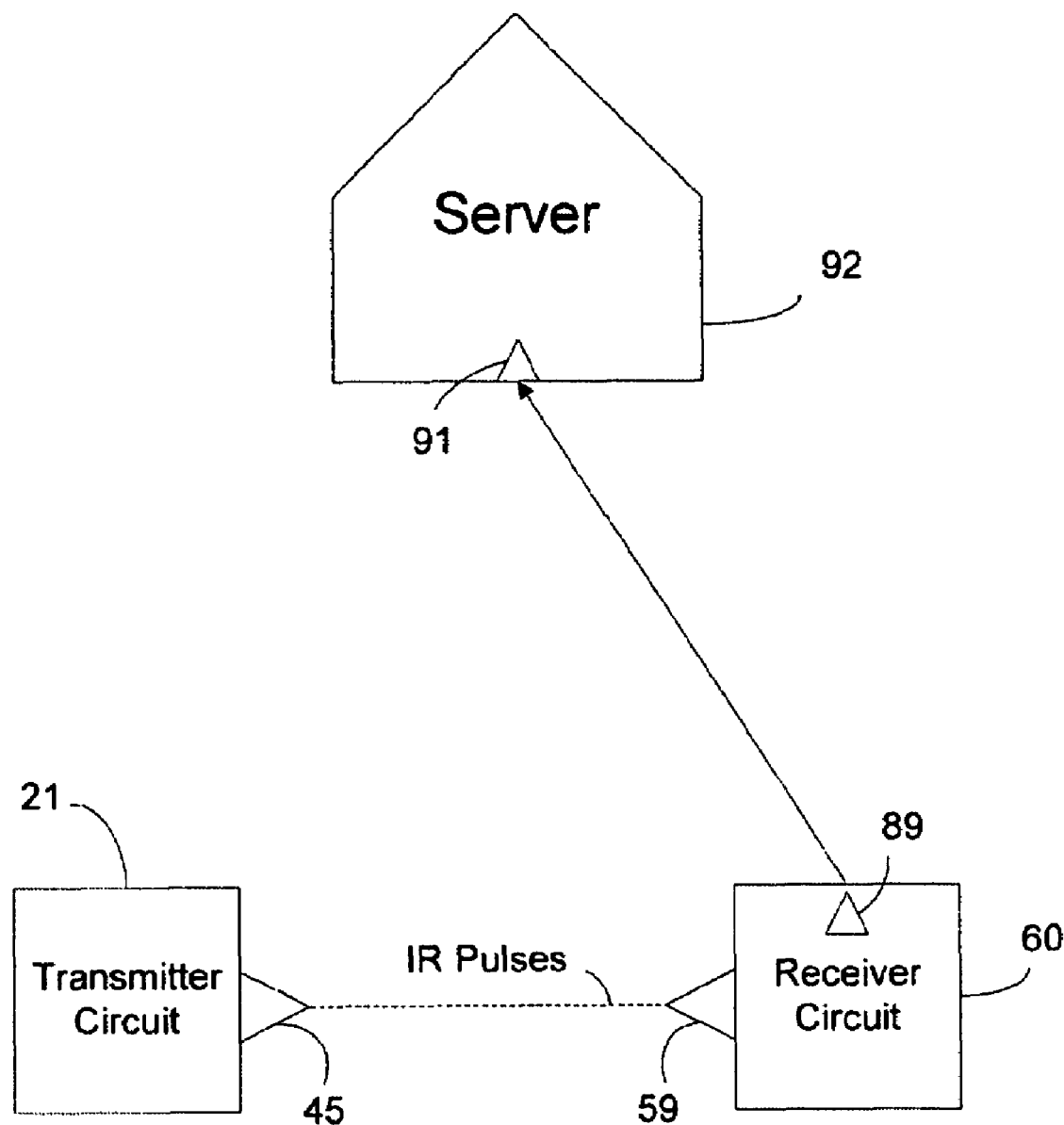
FIG. 13 is a schematic block diagram showing radio frequency transmission of data from the receiver circuit to a server.

The RF transmitter 89 receives RF-DATA as an input at its pin 2 from a pin 9 of the microcomputer 61 (see FIG. 4). This data is transmitted through pin 5 of the RF transmitter 89 (see FIG. 8) and an antenna 90 to a receiver 91 (see FIG. 13) having a frequency of 418 MHz of a server 92. The transmitter 89 (see FIG. 8) is powered by the battery 85 (see FIG. 6) through VBAT2 being supplied to a pin 7 of the transmitter 89 (see FIG. 8).

As shown at step 93 in the flow chart of FIG. 11, the transmitter 89 (see FIG. 8) transmits a data packet at least every 30 seconds. As indicated at decision 94 in FIG. 11, the data packet also is transmitted every 10 seconds if there has been breaking of the beam of the burst of the ten IR pulses from the IR LED 45 (see FIG. 2). The transmitted data packet includes the serial number of the receiver circuit 60 (see FIG. 4), the status of the receiver circuit 60, the total count of the receiver circuit 60, and the number of consecutive times that the beam of the burst of the ten IR pulses from the IR LED 45 (see FIG. 2) has been broken since the last receipt of the beam of the burst of the ten IR pulses by the sensor 59 (see FIG. 4).

An oscillator 94 is connected to pins 2 and 3 of the microcomputer 61 (see FIG. 4) of the receiver circuit 60 to supply internal clocking for the microcomputer 61. The oscillator 94 has a frequency of 4 MHz. One suitable example of the oscillator 94 is sold by Panasonic Industrial Company ECG, 15455N.W. Greenbrier Parkway, Beaverton, Oreg. as model EFO-S3584E5.

Considering the operation of the wireless object counter of the present invention, when the push button 30 (see FIG. 1) is held in its closed position for more than ten seconds as indicated at the decision 52 in FIG. 10, this places the transmitter circuit 21 (see FIG. 1) in its shipping mode as indicated at step 111 in FIG. 10. The push button 30 (see FIG. 1) also would be pressed for more than ten seconds whenever it is desired to render the wireless object counter inactive such as storing the wireless object counter, for example.

As shown at step 112 in FIG. 10, the transmitter circuit 21 (see FIG. 1) no longer has the LED 45 (see FIG. 2) transmit when the push button 30 (see FIG. 1) is held in its closed position for more than ten seconds. The microcomputer 21 also is inactivated; only the clock circuit 22 (see FIG. 2) continues to operate.

To render the transmitter circuit 21 (see FIG. 1) active after it is placed in the shipping mode, the push button 30 must be moved again to its closed position as indicated by decision 113 in FIG. 10. With the push button 30 (see FIG. 1) held in its closed position for more than four seconds and no more than six seconds, as indicated by decision 114 and the decision 43B, respectively, in FIG. 10, the transmitter circuit 21 (see FIG. 1) is placed in its high power mode as indicated at the step 44 in FIG. 10.

This also causes the LED 49 (see FIG. 1) to be lit for two seconds as indicated at the step 51 in FIG. 10. This also places the transmitter circuit 21 (see FIG. 1) in its normal operation (online mode) and its high power mode.

The same result is obtained if the transmitter circuit 21 is in its normal operation (online mode) as indicated at the step 53 in FIG. 10 and the push button 30 (see FIG. 1) is moved to its closed position as shown at decision 115 in FIG. 10 and held for more than four seconds as indicated at the decision 43A in FIG. 10 and no more than six seconds as disclosed at the decision 43B in FIG. 10. Again, the LED 49 (see FIG. 1) is lit for two seconds as indicated at the step 51 in FIG. 10. This also places the transmitter circuit 21 (see FIG. 1) in its normal operation (online mode) and its high power mode.

If the push button 30 (see FIG. 1) is moved to its closed position as indicated by the decision 115 in FIG. 10 after it has been in its normal operation (online mode) and the push button 30 (see FIG. 1) is not held in its closed position for more than four seconds, this is disregarded as unintentional as indicated at step 116 in FIG. 10. The transmitter circuit 21 (see FIG. 1) remains in its normal operation (online mode) and does not change its power mode.

If the push button 30 is not held in its closed position for more than four seconds after the transmitter circuit 21 has been in its shipping mode, then the LED 49 flashes, as disclosed at step 117 in FIG. 10, to indicate that the push button 30 (see FIG. 1) has been in its closed position but not for a sufficient time to change the transmitter circuit 21 from its shipping mode.

When the push button 30 is held in its closed position for more than six seconds, as shown by the decision 43B in FIG. 10, and less than ten seconds, as indicated by the decision 52, then the transmitter circuit 21 (see FIG. 1) is placed in its low power mode. This is disclosed at the step 52A in FIG. 10.

It should be understood that closing of the push button 30 (see FIG. 1) causes the pin 5 of the microcomputer 20 to go high since it is connected to VBAT. The period of time that the pin 5 of the microcomputer 20 is high determines the specific mode in which the microcomputer 20 functions under control of the software in the microcomputer 20.

As shown in FIG. 4, the receiver circuit 60 includes a push button 120, which connects VBAT2 to pin 5 of the microcomputer 61. As shown at decision 121 in FIG. 12, holding the push button 120 in its closed position for more than eight seconds results in the receiver circuit 60 (see FIG. 4) being placed in its shipping mode as indicated at step 122 in FIG. 12. This results in the receiver circuit 60 (see FIG. 4) stopping all activity as indicated at step 123 in FIG. 12.

Figure 12:
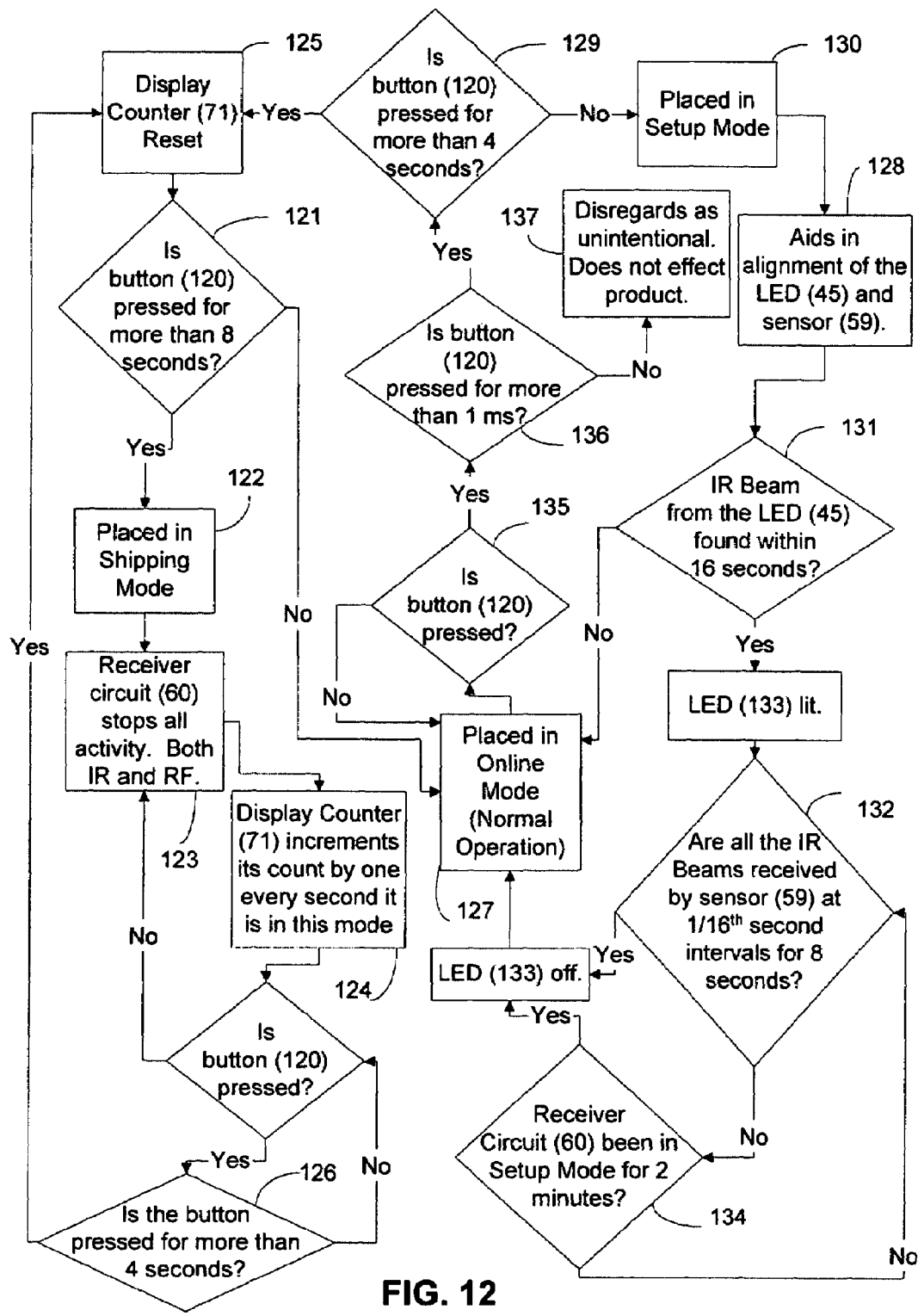
FIG. 12 is a flow chart disclosing the various modes in which the microcomputer of the receiver circuit can be placed by the time that the push button is held in its closed position.

With the receiver circuit 60 (see FIG. 4) in its shipping (inactive) mode as indicated by the step 123 in FIG. 12, the display counter 71 (see FIG. 7) increments its count by one every second that the receiver circuit 60 (see FIG. 4) remains in its inactive mode. This is shown at step 124 in FIG. 12.

When the display counter 71 (see FIG. 7) exceeds its total display count, it automatically returns to a count of zero where it begins to count again if the receiver circuit 60 (see FIG. 4) is still inactive. This continuing changing count in the display counter 71 (see FIG. 7) shows that the receiver circuit 60 (see FIG. 4) is in its shipping (inactive) mode.

If the push button 120 is held in its closed position for more than four seconds when the receiver circuit 60 is in its inactive mode as indicated at decision 126 in FIG. 12, this resets the display counter 71 (see FIG. 7) as disclosed at step 125 in FIG. 12.

By releasing the push button 120 (see FIG. 4) after not more than eight seconds, the receiver circuit 60 is placed in its normal operation (online mode) as indicated at step 127 in FIG. 12.

With the receiver circuit 60 (see FIG. 4) in its normal operation (online mode) after it has been in its shipping (inactive) mode, it is necessary to align the sensor 59 (see FIG. 4) with the IR LED 45 (see FIG. 2) so that the sensor 59 (see FIG. 4) receives the beam of each of the bursts of the at least ten infrared pulses from the IR LED 45 (see FIG. 2). This is shown at step 128 in FIG. 12.

To accomplish this alignment, the push button 120 (see FIG. 4) is held in its closed position for no more than four seconds, as indicated at decision 129 in FIG. 12, so that the receiver circuit 60 (see FIG. 4) is placed in its setup mode, as disclosed at step 130 in FIG. 12. As previously mentioned, the step 128 in FIG. 12 discloses that the setup mode aids alignment of the sensor 59 (see FIG. 4) with the IR LED 45 (see FIG. 2) for the sensor 59 (see FIG. 4) to receive the beam of each of the bursts of the at least ten infrared pulses from the IR LED 45 (see FIG. 2).

If the beam of each of the bursts of the at least ten infrared pulses from the IR LED 45 is not found by the sensor 59 (see FIG. 4) within sixteen seconds as indicated at decision 131 in FIG. 12, then the receiver circuit 60 (see FIG. 4) is returned to its online mode. It is then necessary to shift the position of the sensor 59 and repeat the process until the beam of at least one of the bursts of the at least ten infrared pulses from the IR LED 45 (see FIG. 2) is found by the sensor 59 (see FIG. 4) within sixteen seconds as shown by the decision 131 in FIG. 12.

Additionally, the beam of each of the bursts of the at least ten infrared pulses generated at the $\frac{1}{16}$ second intervals by the IR LED 45 (see FIG. 2) for eight seconds must be received at the sensor 59 (see FIG. 4). This is shown at decision 132 in FIG. 12.

If the beams of all of the bursts of the ten infrared pulses generated over eight seconds by the IR LED 45 (see FIG. 2) are not received by the sensor 59 (see FIG. 4), then an LED 133 glows for two minutes as shown at decision 134 in FIG. 12. The energization of the LED 133 (see FIG. 4) indicates that there has been reception by the sensor 59 of at least one of the beams of each of the bursts of the at least ten infrared pulses generated by the IR LED 45 (see FIG. 2) for eight seconds but all have not been received. Accordingly, further adjustment is again necessary of the position of the sensor 59 (see FIG. 4) relative to the beam of each of the bursts of the at least ten infrared pulses from the IR LED 45 (see FIG. 2).

As disclosed at decisions 135 and 136 in FIG. 12, if the push button 120 (see FIG. 4) is pressed and held in its closed position for not more than one millisecond, this is deemed an accidental movement. This is disregarded as indicated at step 137 in FIG. 12.

It should be understood that the delay time may be after the cycle off time in FIG. 14 for the transmitter circuit 21 (see FIG. 1) rather than before the cycle off time so that the IR LED 45 (see FIG. 2) is not energized when the microcomputer 20 (see FIG. 1) is activated but after the delay of 150 μs. This would require the software for the microcomputer 20 to be changed.

Appendix I shows the source code of the software used in the microcomputer 20 (see FIG. 1) of the transmitter circuit 21. Appendix II discloses the source code of the software used in the microcomputer 61 (see FIG. 4) of the transmitter circuit 60.

The impedance values of other capacitors and resistors which have not been specifically described follow. Each of capacitors 140 (see FIG. 1) and 141 (see FIG. 4) has a capacitance of 3.3 micro farads. A resistor 142 has a resistance of 2.2K ohms. Each of capacitors 143 (see FIG. 3) and 144 has a capacitance of 10 micro farads. A capacitor 145 has a capacitance of 1 micro farad. All of the impedance values in the parallel resonant circuit of FIG. 4 are the same as in the parallel resonant circuit of FIG. 1.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A wireless object counter comprising:
   a continuously cycling transmitter circuit and a receiver circuit separated from each other to provide a path therebetween along which objects to be counted move;
   said transmitter circuit having its operation independent of any activity of said receiver circuit;
   said transmitter circuit having a continuously operating clock circuit for causing a burst of a predetermined minimum number of infrared pulses as a beam during a predetermined period of time;
   said receiver circuit having a continuously operating clock circuit of the same frequency as said clock circuit of said transmitter circuit so that said clock circuit of said receiver circuit is synchronized with said clock circuit of said transmitter circuit only when said receiver circuit is to be activated for a cycle of operation to determine if the transmitted burst of a predetermined number of infrared pulses as a beam from said transmitter circuit is received;
   said receiver circuit being activated prior to said transmitter circuit transmitting a burst of a predetermined number of infrared pulses as a beam when said receiver circuit is to be activated for the cycle of operation;
   and said receiver circuit having a counter for counting each time that the beam of the infrared pulses of each of the bursts of at least the predetermined minimum number of infrared pulses is interrupted by an object to be counted.

2. The wireless object counter according to claim 1 comprising said clock circuit of said transmitter circuit being the only continuously operating element in said transmitter circuit and said clock circuit of said receiver circuit being the only continuously operating element in said receiver circuit.

3. The wireless object counter according to claim 2 comprising said clock circuit of said receiver circuit being synchronized with said clock circuit of said transmitter circuit each time after said receiver circuit has received a burst of a predetermined minimum number of infrared pulses as a beam from said transmitter circuit by synchronization of said clock circuit of said receiver circuit with said clock circuit of said transmitter circuit.

4. The wireless object counter according to claim 3 comprising said receiver circuit being inactivated when it does not receive one of the bursts of a predetermined minimum number of infrared pulses as a beam from said transmitter circuit for a predetermined number of times that the bursts of a predetermined minimum number of infrared pulses as a beam are transmitted from said transmitter circuit.

5. The wireless object counter according to claim 2 comprising said receiver circuit being inactivated when it does not receive one of the bursts of a predetermined minimum number of infrared pulses as a beam from said transmitter circuit for a predetermined number of times that the bursts of a predetermined minimum number of infrared pulses as a beam are transmitted from said transmitter circuit.

6. The wireless object counter according to claim 1 comprising said receiver circuit being inactivated when it does not receive one of the bursts of a predetermined minimum number of infrared pulses as a beam from said transmitter circuit for a predetermined number of times that the bursts of a predetermined minimum number of infrared pulses as a beam are transmitted from said transmitter circuit.

7. The wireless object counter according to claim 1 comprising:
   a first battery for powering said transmitter circuit;
   and a second battery for powering said receiver circuit.

8. The wireless object counter according to claim 1 comprising a display for displaying as a count of the number of objects counted only the first count of any plurality of successive counts received by said counter of said receiver circuit until there is an interruption of the successive counts.

9. The wireless object counter according to claim 1 comprising said receiver circuit continuing to cycle until said receiver circuit fails to receive one of the bursts of the infrared pulses from said transmitter circuit for a predetermined number of cycles of operation of said receiver circuit.

10. The wireless object counter according to claim 9 comprising said receiver circuit ceasing to cycle for a predetermined period of time after it fails to receive one of the bursts of the infrared pulses from said transmitter circuit for the predetermined number of cycles of operation of said receiver circuit.

11. The wireless object counter according to claim 10 in which said receiver circuit is activated for at least one cycle of operation after ceasing to cycle for the predetermined period of time to determine if said receiver circuit receives one of the bursts of at least the predetermined minimum number of the infrared pulses as a beam from said transmitter circuit during the at least one cycle of operation that said receiver circuit is activated.

12. The wireless object counter according to claim 1 in which at least the predetermined minimum number of the infrared pulses transmitted by said transmitter circuit is a constant.

13. The wireless object counter according to claim 1 in which said receiver circuit is activated for at least one cycle of operation after ceasing to cycle for the predetermined period of time to determine if said receiver circuit receives one of the bursts of at least the predetermined minimum number of the infrared pulses as a beam from said transmitter circuit during the at least one cycle of operation that said receiver circuit is activated.

14. A method of wireless counting of objects moving along a predetermined path comprising:
 transmitting a beam of at least a predetermined minimum number of infrared pulses, under control of a continuously operating clock circuit of a continuously cycling transmitter circuit having its operation independent of any activity of a receiver circuit, from the transmitter circuit across the predetermined path during each cycle of operation of the receiver circuit so that the beam of at least the predetermined minimum number of infrared pulses will be blocked by an object moving along the predetermined path;
 receiving the beam of at least the predetermined minimum number of infrared pulses at the receiver circuit disposed on the opposite side of the predetermined path from the transmitter circuit unless the beam of at least the predetermined minimum number of infrared pulses is blocked, the receiver circuit having a clock circuit of the same frequency as the clock circuit of the transmitter circuit and being synchronized therewith at least during each cycle of operation and the receiver circuit being activated prior to transmission by the transmitter circuit of the beam of at least the predetermined minimum number of infrared pulses;
 counting each time that the receiver circuit does not receive the beam of at least the predetermined minimum number of infrared pulses and storing each count;
 and synchronizing the clock circuit of the receiver circuit with the clock circuit of the transmitter circuit each time that the receiver circuit is to be activated for a cycle of operation.

15. The method according to claim 14 comprising displaying a count of the number of objects by adding only a count of one to a count display irrespective of the number of consecutive cycles of operation that the receiver circuit does not receive the beam of at least the predetermined minimum number of infrared pulses.

16. The method according to claim 15 in which the predetermined period of time that the receiver circuit receives the beam of at least the predetermined minimum number of infrared pulses is a constant.

17. A method of wireless counting of objects moving along a predetermined path comprising:
 transmitting a beam of at least a predetermined minimum number of infrared pulses, under control of a continuously operating clock circuit of a continuously cycling transmitter circuit having its operation independent of any activity of a receiver circuit, from the transmitter circuit across the predetermined path during each cycle of operation of the receiver circuit so that the beam of at least the predetermined minimum number of infrared pulses will be blocked by an object moving along the predetermined path;
 receiving the beam of at least the predetermined minimum number of infrared pulses at the receiver circuit disposed on the opposite side of the predetermined path from the transmitter circuit unless the beam of at least the predetermined minimum number of infrared pulses is blocked, the receiver circuit having a clock circuit of the same frequency as the clock circuit of the transmitter circuit and being synchronized therewith at least during each cycle of operation and the receiver circuit being activated prior to transmission by the transmitter circuit of the beam of at least the predetermined minimum number of infrared pulses;
 counting each time that the receiver circuit does not receive the beam of at least the predetermined minimum number of infrared pulses and storing each count;
 stopping activation of the receiver circuit for a first predetermined period of time after the receiver circuit has not received the beam of at least the predetermined minimum number of infrared pulses for a second predetermined period of time;
 activating the receiver circuit for a third predetermined period of time after the receiver circuit has been stopped for the first predetermined period of time;
 continuing to stop the receiver circuit after each of its activations for the second predetermined period of time if the receiver circuit has not received the beam of at least the predetermined minimum number of infrared pulses during each activation of the receiver circuit for the third predetermined period of time;
 and synchronizing the clock circuit of the receiver circuit with the clock circuit of the transmitter circuit each time that the receiver circuit is to be activated irrespective of whether the receiver circuit has been inactivated for one or more cycles of operation of the beam transmission from the transmitter circuit.

18. The method according to claim 17 comprising displaying a count of the number of objects by adding only a count of one to a count display irrespective of the number of consecutive cycles of operation that the receiver circuit does not receive the beam of at least the predetermined minimum number of infrared pulses.

19. The method according to claim 18 in which each first predetermined period of time that activation of the receiver circuit is stopped is a constant.

20. The method according to claim 17 in which each first predetermined period of time that activation of the receiver circuit is stopped is a constant.

21. The method according to claim 20 in which the second predetermined period of time that the receiver circuit has not received the beam of at least the predetermined minimum number of infrared pulses is a constant.

22. The method according to claim 17 in which the second predetermined period of time that the receiver circuit has not received the beam of at least the predetermined minimum number of infrared pulses is a constant.

* * * * *